INVENTOR:
IRVING I. SHULTZ
BY: H.D. Burch
HIS ATTORNEY

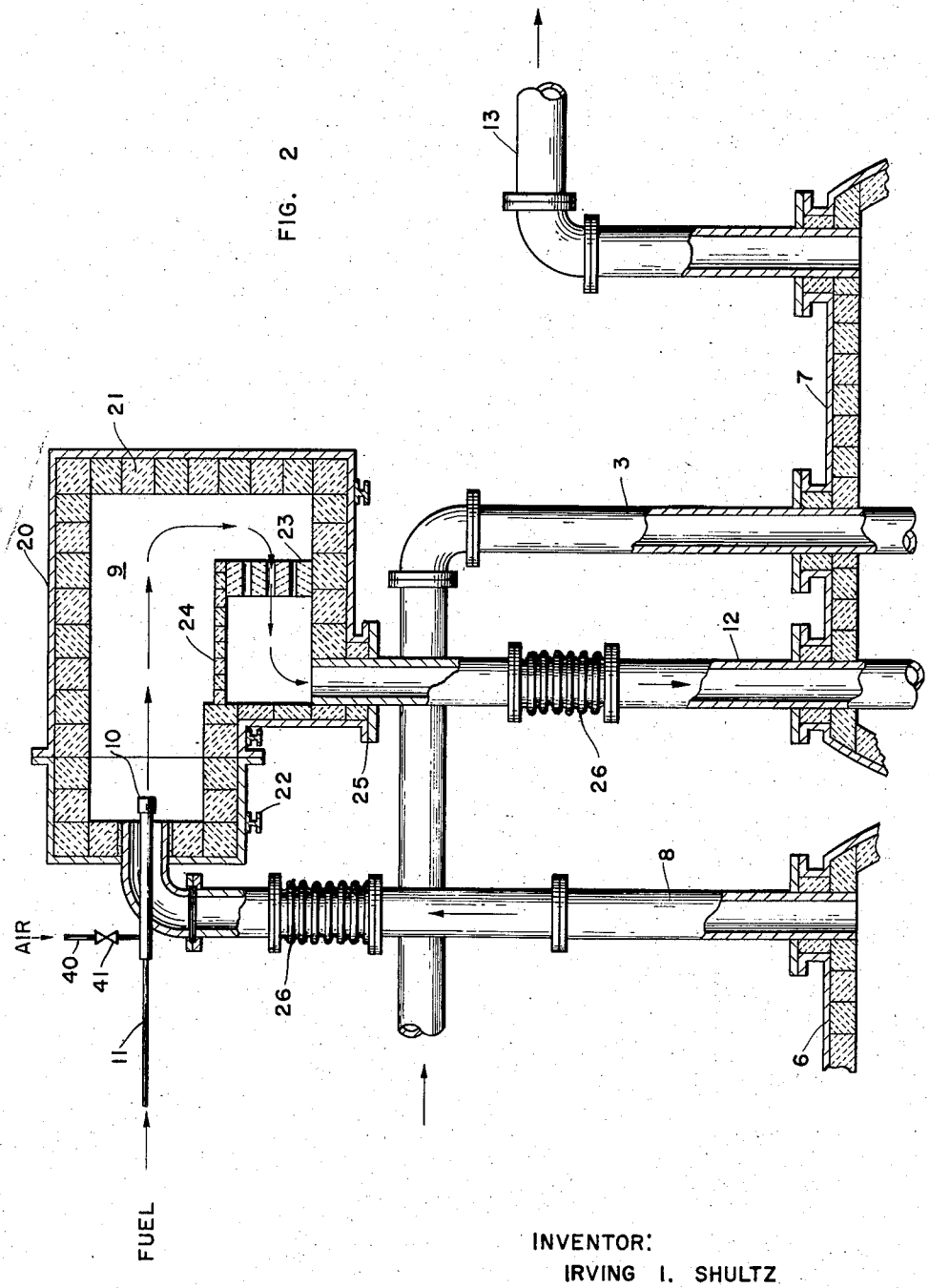

United States Patent Office 2,982,624
Patented May 2, 1961

2,982,624
ACID CONCENTRATION

Irving I. Shultz, Houston, Tex., assignor to Shell Oil Company, a corporation of Delaware Filed Mar. 31, 1958, Ser. No. 724,983

3 Claims. (Cl. 23—307)

This invention relates to the concentration of dilute acid and is more particularly concerned with process and apparatus for concentrating and purifying dilute acid by passing of hot gases therethrough.

A usual process of concentrating and purifying acids, such as weak sulfuric acid, resulting from the treatment of hydrocarbons comprises, sub-dividing the acid to be concentrated into a plurality of stages, and in subjecting the acid in the stages to the treatment of heated gases flowing serially through the plurality of stages, delivered preferably under pressure beneath the surface of the respective acid bodies in said stages. The gases after treating the acid in one stage are delivered to the next stage for treating the acid in said next stage. By such method of treating, the heating of the acid by the hot gases functions to effect a concentration of the acid and to eliminate organic impurities in the acid. By causing the heated gases to flow in succession through the separate bodies of acid in the separate stages, an efficient utilization of the available heat in the hot gases is used for effecting the concentration results.

In the operation of such a process in a unit of given size it is desirable to concentrate as much acid as possible while ensuring that the unit is not overloaded and that foaming does not take place.

Another important factor is the control of the operation so that excessive amounts of acidic gases are not discharged to the atmosphere whereby the efficiency of the recovery system is reduced.

Another consideration in the operation in most areas is the necessity that gases discharged to the atmosphere which are harmful to vegetation and to human and animal life be kept to a minimum, and that such gases as are discharged are within the limits as to acid and other content concentrations set by the various area air pollution control authorities.

It is therefore an object of this invention to reduce the volume of gases discharged to the atmosphere by an acid concentrator.

Another object of this invention is to increase the throughput of an acid concentrator without substantially increasing the volumetric flow of gases through the concentrator.

Another object of this invention is to increase the heat transfer to the acid in an acid concentrator.

The above and other objects of the invention will be apparent to those skilled in the art from the following general statement of the invention and detailed description thereof which follows.

Broadly considered the invention contemplates the re-heating of gases leaving one stage of a series of stages of acid concentration and introducing the reheated gases into another stage. This inter-stage reheating can be applied preferentially to a gas stream leaving the first stage of a series of stages of concentration and introduction of the heated gaseous stream into the second stage.

Referring to the accompanying drawing,

Fig. 2 is an elevation partially in section of the reheater unit and associated piping.

Figure 1:
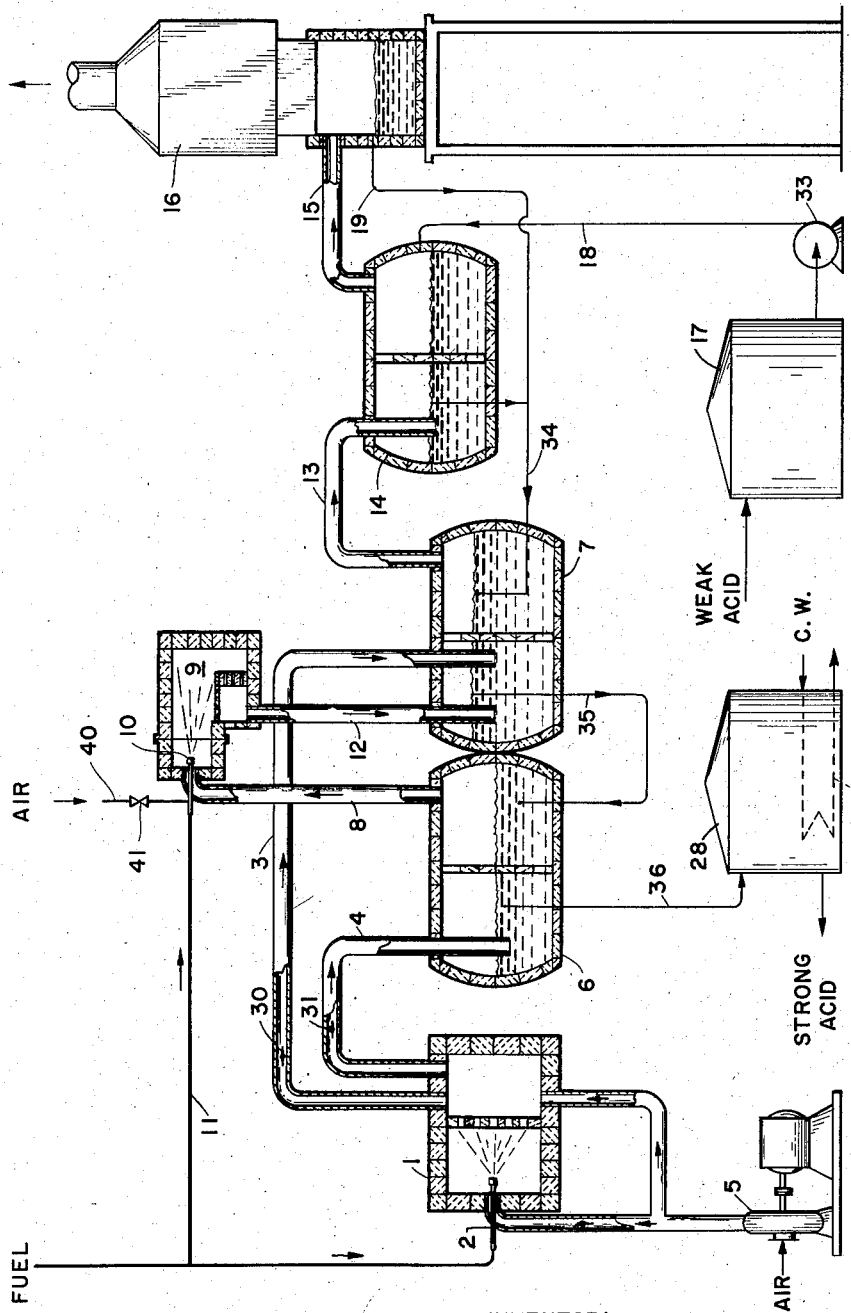
Fig. 1 is a diagrammatic elevation view partly in section of an acid concentration plant.

The apparatus shown in Fig. 1 comprises a main furnace 1 suitably lined with fire brick having a burner means 2 for the combustion of fuel such as natural gas or fuel oil and having flues 3 and 4 for taking off hot flue gas produced. A blower 5 is provided for supplying air under pressure to the furnace. A flue pipe 4 having a damper 31 leads to a horizontal cylindrical steel gas-tight tank 6, passes downward through the top thereof and terminates in the interior of the tank as a dip pipe. A flue pipe 3 having a damper 30 leads to a second similar horizontal cylindrical steel gas-tight tank 7 passes downward through the top of the tank 7 and terminates in the interior thereof as a dip pipe. The two tanks or drums 6 and 7 are preferably lined with lead and acid-proof brick to prevent acidic contents from corroding the steel outer walls or shells. The steel tank shells are of suitable thickness to permit a superatmospheric pressure to be maintained in the tanks. A conduit 8 from the vapor space of the tank 6 passes to a furnace 9 mounted above the two tanks and provided with a burner 10. Fuel, such as natural gas, is fed to the burner through the pipe 11. An air pressure line 40 with control valve 41 is provided for additional air introduction. From the furnace 9, flue pipe 12 is provided for carrying the flue gas downward through the top of the tank 7. The flue pipe 12 terminates in the interior of the tank as a dip pipe. A conduit 13 from the vapor space of tank 7 leads into the top of a third horizontal tank 14 known as the cooling drum. The conduit 13 leads downward into the lower portion of the cooling drum where it terminates as a dip pipe. A conduit 15 from the upper part of the cooling drum passes to an electrical mist precipitator 16 shown diagrammatically.

In operation of the process, gas or oil fuel is combusted with air supplied under pressure by the blower 5 in the combustion chamber of the furnace 1. The furnace is operated so that a hot gas stream comprising combustion gases and air is provided at as high a temperature as practical. Using the best fire brick now available, I have found that a temperature of 1600° F. can be safely maintained in the gas stream leaving the furnace. The hot gases under superatmospheric pressure are led through the flue 4 into the first vessel 6 which is commonly called the "high stage" drum wherein strong acid is produced. The hot gases are discharged beneath the surface of acid in the drum 6 and heat the liquid therein. A portion of the hot gas stream produced in the furnace is led through flue 3 into the tank or drum 7 which is commonly called the "low stage" drum. The hot gases are similarly conducted beneath the surface of acid in the drum and heat the same. By control of dampers 30 and 31 in the flues 3 and 4 the proportion of hot flue gas going to each of the drums 6 and 7 may be regulated as desired. Under certain operating conditions it may be desirable to pass all of the hot flue gas into the high stage drum 6.

The hot flue gases after having given up part of their heat to the liquid in the high stage drum 6 and causing the evaporation of water from the liquid therein, leave the drum by way of conduit 8. The specific temperature to which the hot gas stream is reduced depends on the strength of acid being produced in the high stage drum. In a typical operation of concentrating sulfuric acid the temperature of the gas stream leaving the high stage drum may be 300° F. When strong sulfuric acid, e.g., 93–96%, is being produced, a temperature of 440° F.–470° F. has been reported. The gases leaving the drum 6 by conduit 8 are directly heated in the furnace 9 by the combustion of fuel such as natural gas fed to the furnace under pressure through line 11 and burnt in burner 10. The hydrocarbon fuel combines with the oxygen of the excess air in the mixed gas stream entering the furnace through the conduit 8, and if desired, with an additional small percentage of air introduced through air pressure line 40, reducing the oxygen content of the gas stream and increasing the carbon dioxide content thereof. The gas stream, now at a higher temperature, for example 1200° F., is led downward below the surface of the acid liquid in low stage drum 7. Herein the hot gas stream introduced by conduit 12 and the hot gas stream from the furnace 1 introduced by conduit 30 cause the evaporation of water from the acidic liquid in the drum. The gases leave the surface of the liquid at a reduced temperature. Similarly, as in the case of the gases leaving the high stage drum 6, the temperature of the gases leaving the low stage drum 7 will depend upon the degree of concentration of the acid in the drum. Temperatures of from 250° F. to 360° F. are reported.

The aforesaid gases are conducted by a pipe 13 to a point below the surface of dilute acid in the cooler drum 14. Herein the gases heat up the dilute acid which is usually continuously fed by a pump 33 to the drum 14 from a weak acid storage tank 17 through pipe 18. Temperatures of gases leaving the cooling drum 14 range from 200° F.–260° F. These gases then usually pass to an electrical mist precipitator of the well-known "Cottrell" type such as indicated generally by numeral 16 in Fig. 1. Liquid collected to the precipitator is fed back into the system usually either into low stage drum 7 or the cooling drum 14 by suitable piping 19. The gases remaining thereafter are usually finally vented to the atmosphere through a fume stack (not shown).

The flow of acid through the system it will be seen from Fig. 1 is from the weak acid storage or settling tank into the cooler drum 14. This weak acid, it will be readily understood, may be fed from a constant level gravity feed tank or by a feed pump. The dilute acid flows, in general, countercurrent to the flow of flue gases in the plant. In the Fig. 1 it will be noted that acid flows from right to left and the flue gases from left to right. The acid is passed through the drums in succession. The weakest acid being in drum 14 and the strongest acid in drum 6. The flow of acid from drum to drum is preferably by gravity, so that drum 14 overflows by way of a conduit 34 into drum 7 which in turn overflows by way of a conduit 35 into drum 6. Strong acid leaves drum 6 by a conduit 36.

Fig. 2 shows the furnace 9 in more detail. This "reheat" furnace comprises an outer pressure sustaining cylindrical steel shell 20 having a fire and acid-resistant brick lining 21. A suitable gas or oil burner 10 is located at the firing end and near the connection to the flue gas conduit 8 leading from the top of the high stage drum 6.

The furnace is supported above the drums by a suitable support structure indicated by numeral 22. The furnace is provided with an arch 23 and internal baffle 24. The reheated gases leave the furnace through outlet piece 25 and are carried by conduit 12 into the low stage drum 7. Expansion joints 26 are provided in the pipes 8 and 12 to ensure that fracture of the associated piping does not take place due to heat induced stresses therein.

Strong acid of the desired degree of concentration is withdrawn from the high stage drum 6 and is passed to an acid cooler 28 wherein the hot strong acid is cooled by heat exchange with water flowing through a cooling coil or coils 29. The strong cooled acid is then filtered and passed to storage or to other process equipment as may be desired.

In rating the performance of drum concentrator installations it is usual to rate individual units on the basis of the heat release in the furnace. The rating is dependent upon the capacity of the air blower and the temperature to which the gases leaving the combustion chamber, which temperature using the best available brickwork and piping, cannot at present exceed 1600° F. With a given installation where it is found that the heat release from the furnace gases is as high as possible, the problem arises of increasing the output of the concentrator plant. Increased flue gas flow into the drums from a larger furnace will result in inefficient heat transfer due to fluid flow restrictions and overloading of the flue gas disposal equipment. This in turn causes a greater volume of plume to be emitted to the atmosphere.

By the employment of heat to the flue gas stream leaving the high stage drum by combusting fuel with the excess air of said stream substantial heat is thereby added to the gas stream which can be transferred to the acid in the low stage drum and in the cooler drum without substantially increasing the volume of flue gas.

For example, in one particular plant the heat input was increased 100% while the total volume of flue gas was increased only 25%. It will thus be seen that by the inclusion of my reheat system substantial increase in acid concentrator capacity can be effected with the least additional equipment and least expense.

While I have described my invention in connection with the concentration of sulfuric acid, it should be understood that the invention is applicable to the treatment of other acidic solutions which are capable of being concentrated by drum-type concentrators such as various sludge and waste acids resulting from the refining of hydrocarbons. It is possible, by the use of my invention, to reheat the gas stream leaving the high stage drum by burning introduced fuel with the oxygen in the gas stream.

In some situations it is desirable to introduce up to a stoichiometric amount of air into the furnace 9 to effect the combustion of the fuel introduced. Both the above types of operation are contemplated by my invention.

I claim as my invention:

1. A process of concentrating an acid comprising: confining a plurality of separate bodies of the acid each of which bodies is of a different concentration of the acid; flowing the acid continuously from a body of low acid concentration to a body of higher acid concentration; at the same time, flowing a stream of oxygen-rich heated gases through the body of highest acid concentration by delivering the gases to the body below the surface thereof so as to pass upwardly therethrough; removing continuously the gases from above the surface of the body of highest acid concentration; adding fuel to the removed gases to form a combustible mixture with the oxygen therein; burning the mixture so that the temperature of the removed gases is raised; and flowing a stream of the resulting heated gases through a body of lower acid concentration by delivering the heated gases to the body below the surface thereof so as to pass upwardly therethrough.

2. A process of concentrating an acid as in claim 1 wherein the burning of the mixture is carried out in a separate furnace.

3. A process of concentrating an acid as in claim 1 comprising the additional step of adding a controlled amount of air to the mixture before burning so that the burning of the mixture will raise the temperature of the removed gases to about 1200° F.

References Cited in the file of this patent

UNITED STATES PATENTS

| | | |
|---|---|---|
| 1,790,507 | Mast | Jan. 27, 1931 |
| 2,155,633 | Bacchi | Apr. 25, 1939 |
| 2,327,039 | Heath | Aug. 17, 1943 |
| 2,407,166 | Kreitner et al. | Sept. 3, 1946 |
| 2,418,911 | Smith | Apr. 15, 1947 |
| 2,647,370 | Miller | Aug. 4, 1953 |
| 2,653,077 | Ogilvie | Sept. 22, 1953 |
| 2,668,366 | Barnett | Feb. 9, 1954 |
| 2,756,029 | Brogdon | July 24, 1956 |